United States Patent
Suzuki et al.

[11] Patent Number: 6,079,764
[45] Date of Patent: Jun. 27, 2000

[54] WIRING HARNESS ARRANGING CONSTRUCTION

[75] Inventors: Masahisa Suzuki; Tetsuya Takimoto; Yasuhiro Ando; Tetuya Funaki; Shinichi Suehiro, all of Yokkaichi, Japan

[73] Assignee: Sumitomo Wiring Systems, Ltd., Japan

[21] Appl. No.: 08/871,819

[22] Filed: Jun. 9, 1997

[30] Foreign Application Priority Data

Jun. 14, 1996 [JP] Japan .................................. 8-154378

[51] Int. Cl.⁷ ...................................................... B60J 5/04
[52] U.S. Cl. ...................... 296/146.1; 296/152; 296/208; 49/502; 174/72 A; 307/10.1
[58] Field of Search ................... 296/152, 146.1, 296/146.7, 146.5, 208, 146.9; 174/72 A, 152 G, 153 G; 49/502; 307/10.1

[56] References Cited

U.S. PATENT DOCUMENTS

| | | | |
|---|---|---|---|
| 4,862,011 | 8/1989 | Wright | 296/146.9 X |
| 5,092,647 | 3/1992 | Ueda et al. | 296/146.9 |
| 5,405,672 | 4/1995 | Takiguchi et al. | 296/146.9 X |
| 5,584,144 | 12/1996 | Hisano | 296/146.5 X |
| 5,588,260 | 12/1996 | Suzuki et al. | 296/208 X |
| 5,716,044 | 2/1998 | Peterson et al. | 296/152 |

FOREIGN PATENT DOCUMENTS

| | | |
|---|---|---|
| 0 341 079 | of 1989 | European Pat. Off. . |
| 2 616 390 | of 1988 | France . |
| 35 00 359 | of 1986 | Germany . |
| 39 16 468 | of 1990 | Germany . |
| 8-48146 | of 1996 | Japan . |

*Primary Examiner*—Joseph D. Pape
*Attorney, Agent, or Firm*—Anthony J. Casella; Gerald E. Hespos; Michael J. Porco

[57] ABSTRACT

A guide member 10 made of an elastic material has an arcuate portion 10a which extends and contracts while twisting. A wiring harness D·W/H is arranged between a door and a body of a vehicle after being mounted on the guide member 10, and the opposite ends of the guide member 10 are fixed to the door and the body, so that the movements of the guide member and the wiring harness can follow the opening and closing movements of the door. The arcuate portion 10a is so configured as to construct a part of a torsion coil spring.

14 Claims, 9 Drawing Sheets

FIG.12(B)
PRIOR ART (DOOR OPEN)  (DOOR CLOSED)

WIRING HARNESS ARRANGING CONSTRUCTION

BACKGROUND OF THE INVENTION

1. Field of the Invention

The present invention relates to a wiring harness arranging device for use in a door hinge portion of a vehicle. The wiring harness arranging device is particularly designed to facilitate installation and to prevent the entrance of water with a simple means by arranging a wiring harness more toward a passenger compartment than a hinge point and more inward than a weatherstrip.

2. Description of the Prior Art

A prior art door harness may be arranged from a door side to a body side of a vehicle and may be connected with an instrument panel harness (hereinafter, "IP harness") at the body side. Alternatively, the prior art IP harness may be arranged from the body side to the door side and may be connected with the door harness at the door side. The prior art door harness typically is arranged in substantially the same position as a hinge point of the door in the horizontal direction, but displaced therefrom along the vertical or height direction, so that the door harness is only bent without being extended or contracted as the door is opened and closed.

Figure 8:
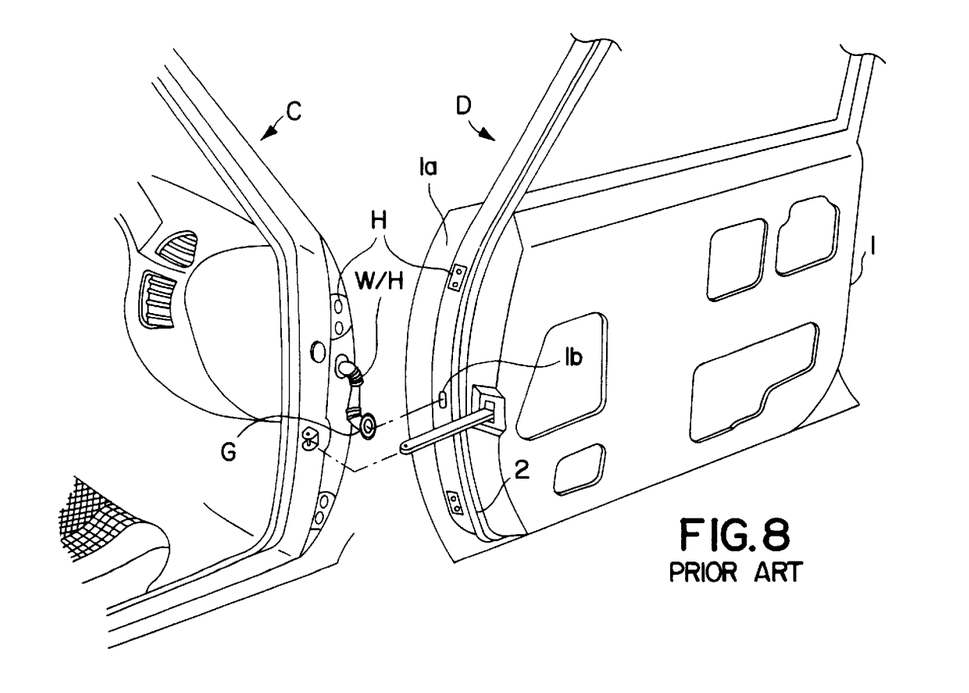
FIG. 8 is a partially exploded perspective view of a door hinge portion according to prior art.
Figure 9:
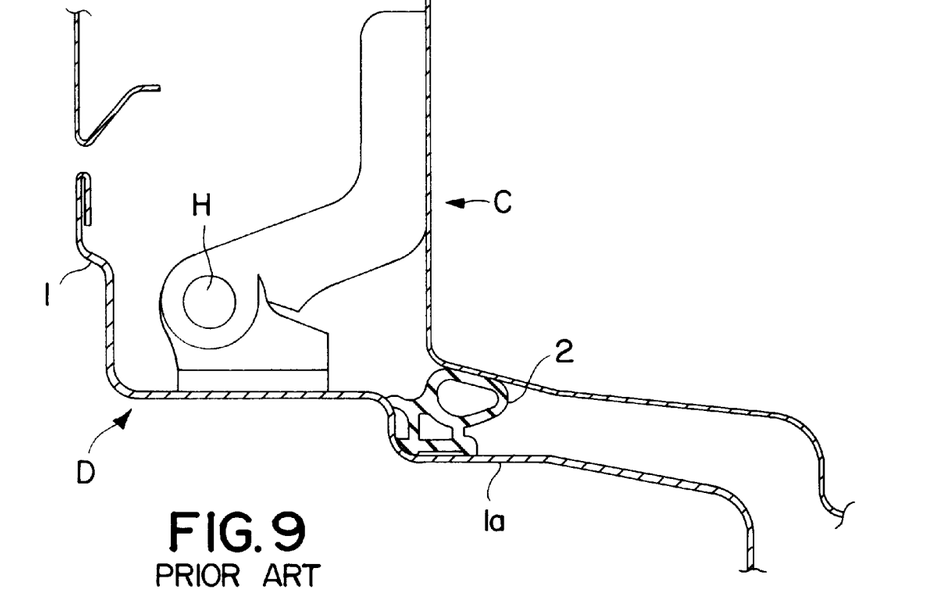
FIG. 9 is a plan view in section showing a positional relationship of a hinge and a weatherstrip.

FIGS. 8 and 9 show a prior art hinge H for connecting a body C and a door D. The hinge H is mounted substantially in the middle of an end surface 1a of a door panel 1. A door harness W/H needs to be arranged inside the door panel 1 and taken outside the door D through a through hole 1b formed in the end surface 1a. It takes time and labor to arrange the wiring harness inside the door panel 1 and to pass it through the through hole 1b.

Further, a weatherstrip 2 is mounted on the door D in order to prevent the entrance of water. Since the weatherstrip 2 is mounted more toward the passenger compartment than the hinge H, the wiring harness W/H is located more away from the passenger compartment than the weatherstrip 2. Accordingly, the weatherstrip 2 cannot fulfill its water preventing function at the location where the wiring harness is arranged, necessitating a water preventing construction for the wiring harness W/H. In view of this, a conventional practice has been to mount waterproof grommets on the holes formed in the body C and the door D for the arrangement of the wiring harness W/H, and a certain measure is taken to make the wiring harness W/H waterproof. However, such a practice is costly and cumbersome.

The above problem can be solved by arranging the wiring harness W/H more toward the passenger compartment than the weatherstrip 2. However, in such a case, since the arrangement position of the wiring harness W/H is displaced from the hinge point along the horizontal direction, the wiring harness W/H needs to be extended and contracted when the door D is opened and closed. In other words, the wiring harness to be arranged in the door hinge portion is required to have both an extendible/contractible function and a twist take-up function.

Figure 10:
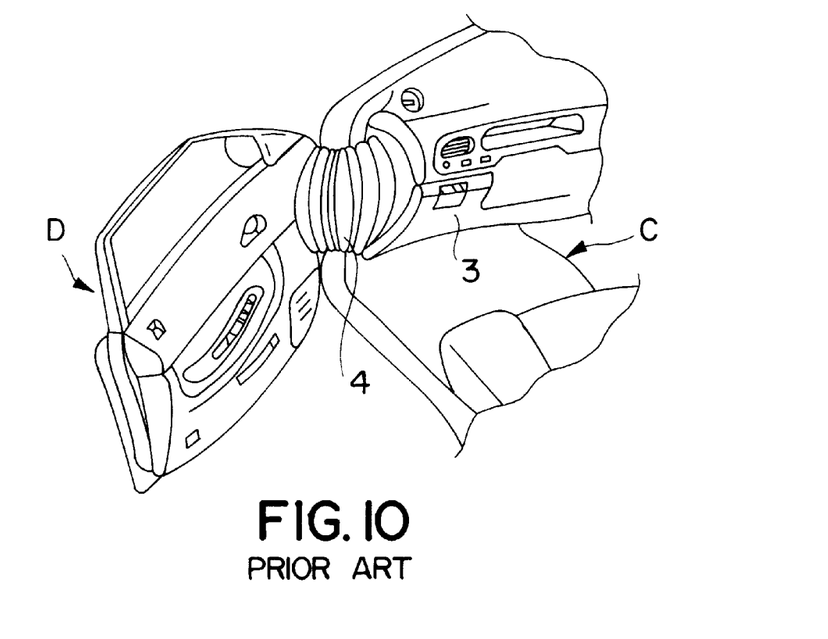
FIG. 10 is a perspective view of another prior art.
Figure 11:
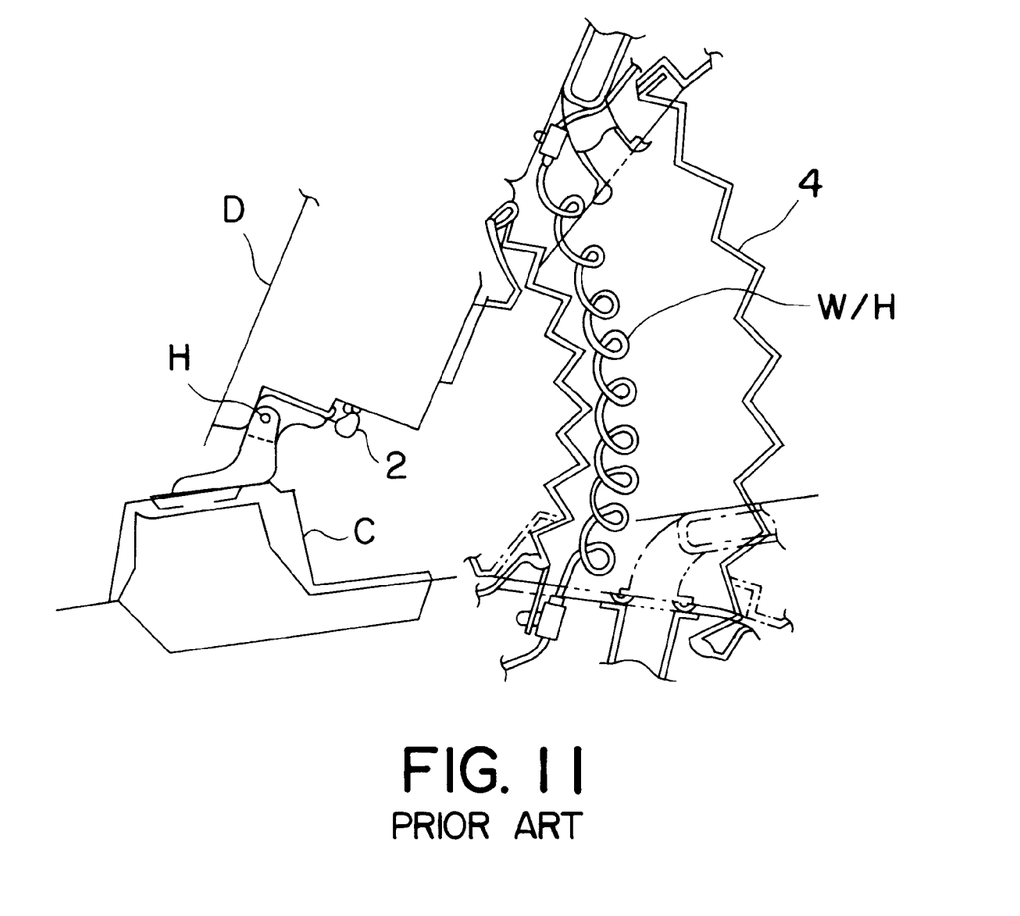
FIG. 11 is an enlarged section of an essential portion of the prior art of FIG. 10.

A construction in which a wiring harness is arranged more toward the passenger compartment than a weatherstrip is disclosed in Japanese Unexamined Patent Publication No. 8(HEI)-48146. Specifically, as shown in FIGS. 10 and 11 of that reference, a corrugated duct 4 for covering an air conditioning duct is mounted between a side cover 3 of an instrument panel and an inner surface 1c of a door opposite to the side cover 3, and a wiring harness W/H spirally wound to have a margin length is arranged inside this duct 4.

Figure 12A:
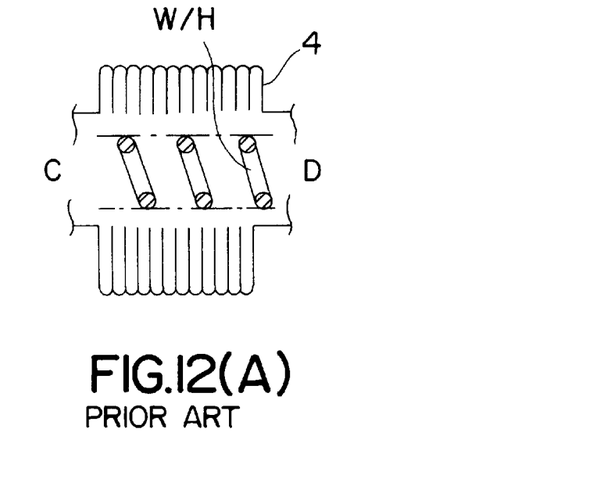
FIGS. 12(A) and 12(B) are schematic diagrams of the prior art of FIG. 10 in its normal state.
Figure 12B:
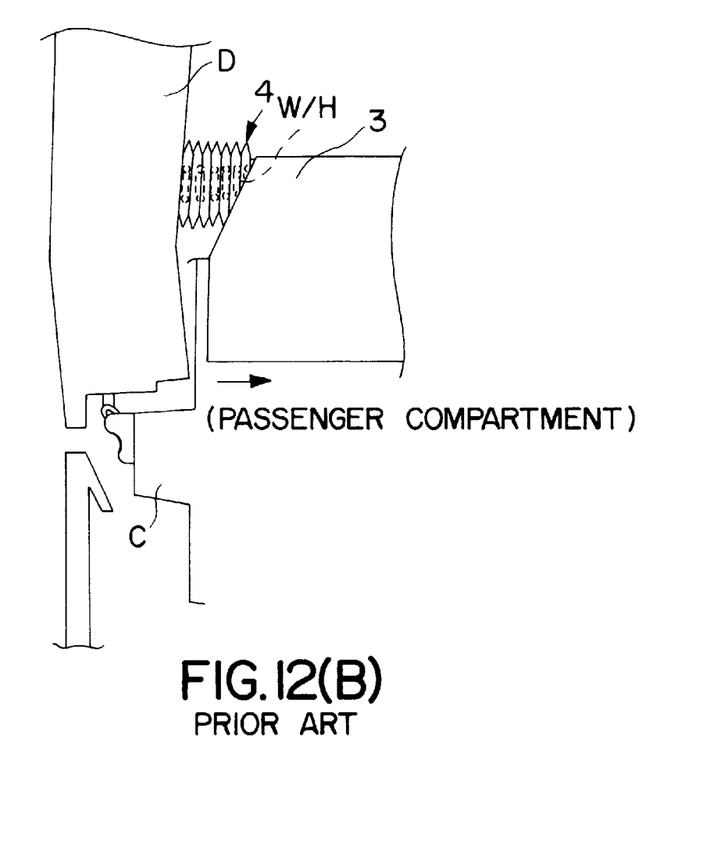
Figure 13A:
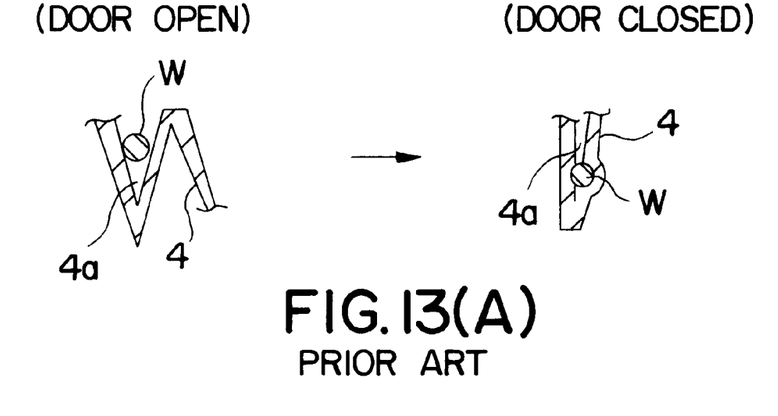
FIGS. 13(A) and 13(B) are schematic diagrams of the prior art of FIG. 10 in its abnormal state.
Figure 13B:
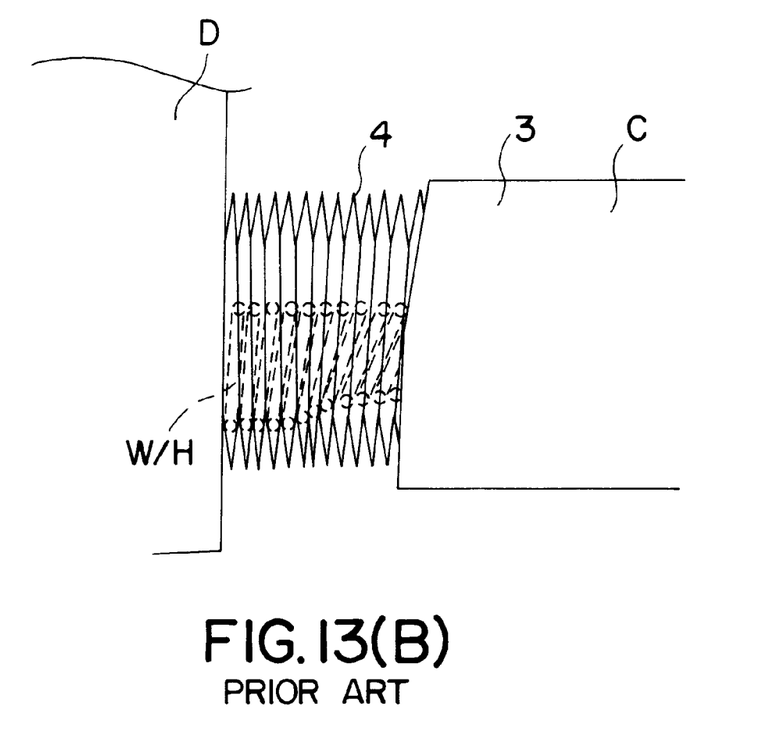

However, since the spiral wiring harness W/H is arranged inside the corrugated duct 4 in the above construction, several problems may occur. For example, when the wiring harness W/H extends in the center of the corrugated duct 4 as shown in FIGS. 12(A) and 12(B), the corrugated duct 4 and the spiral wiring harness W/H are allowed to extend and contract in a normal manner. However, if a part W of the wiring harness W/H enters a recess 4a of the corrugation of the duct 4 as shown in FIG. 13(A), the duct 4 cannot contract. If the door is closed in this state as shown in FIG. 13(B), the duct 4 and the wiring harness W/H may be damaged by being jammed between the door panel 1 and the side cover 3 and, in a worst case, the wire may be cut. Additionally the spiral wiring harness W/H is not necessarily constantly restored to its specific configuration after the extension or contraction. If the outer diameter of the wiring harness becomes larger than the inner diameter of the corrugated duct 4, the corrugated duct 4 is destroyed and cannot contract any longer. Since the corrugated duct 4 is exposed to the passenger compartment, it may be deformed by an external force. In such a case, the spiral wiring harness W/H located inside may enter the recess 4a of the duct 4, and accordingly the problem of FIGS. 13(A) and 13(B) is likely to occur. Furthermore, when the door D is opened and closed, a force to extend and contract the corrugated duct 4 is needed in addition to a door opening/closing force, disadvantageously making the door heavier for a driver or passenger to open and close it.

In order to overcome above problems, it is an object of the present invention to provide a wiring harness arranging device allowing arrangement of a wiring harness in a position at a radial distance from a hinge point between two elements that move and/or rotate with respect to each other, the position being preferably more toward a passenger compartment than a hinge point and preferably more inward than a weatherstrip, to facilitate an arrangement operation and to prevent the entrance of water with a simple means.

SUMMARY OF THE INVENTION

According to the invention, there is provided a wiring harness arranging device for arranging a wiring harness between a first element and a second element that are movable and/or rotatable with respect to each other, in particular between a vehicle body and a door in a position more toward a passenger compartment than either a weatherstrip or a mount position of a hinge for connecting the vehicle body and the door. The wiring harness arranging device comprises at least one guide member which is made of an elastic material and is so formed as to have an arcuate portion which extends and contracts while twisting. The wiring harness is mounted on or in the guide member to be arranged between the first and second elements, in particular between the door and the vehicle body. Opposite ends of the guide member are fixed to the first and second elements, in particular to the door and the vehicle body, respectively, so that the movement of the guide member and the wiring harness follows relative movements of the first and/or second elements, in particular the opening and closing movements of the door.

Accordingly the wiring harness arranging device allows for an arrangement of the wiring harness in such a manner as to have both a bent or twist take-up function and an extendible/contractible function, these two functions being combined in a twist/untwist function of the wiring harness arrangement construction.

According to a preferred embodiment of the invention, the arcuate portion of the guide member substantially constructs or is arcuate as at least a part of a torsion coil spring.

Preferably, the arcuate portion of the guide member is a substantially S-shaped continuous arcuate portion.

Further preferably, a door fixing portion and/or a body fixing portion are provided at bent portions formed by bending the opposite ends of the arcuate portion.

According to a further embodiment, the guide member is in the form of a tube through which the wiring harness is passed.

Preferably, the guide member is in the form of a plate to which the wiring harness is fixed by taping.

Further preferably, the restoring force of the guide member is set such that the guide member is restored to its original shape faster than the first and second elements are moved toward each other, in particular than the door is closed.

Most preferably, the door fixing portion and the body fixing portion are fixed to opposite end surfaces of the door and of the vehicle body, or to an end surface or a lower surface of an instrument panel of the vehicle body toward the door and a surface of the door toward the passenger compartment.

According to a further preferred embodiment of the invention, there is provided a wiring harness arranging device for arranging a wiring harness between a vehicle body and a door in a position more toward a passenger compartment than either a weatherstrip or a mount position of a hinge for connecting the vehicle body and the door. The wiring harness arranging device comprises a guide member which is made of an elastic material and is so formed as to have an arcuate portion which extends and contracts while twisting. The wiring harness is mounted on the guide member between the door and the vehicle body and the opposite ends of the guide member are fixed to the door and the vehicle body, respectively, so that the movement of the guide member and the wiring harness follows opening and closing movements of the door.

If the wiring harness is mounted on the guide member which extends and contracts while twisting, since the guide member extends while twisting and contracts while untwisting as the door is opened and closed, the movement of the wiring harness mounted on the guide member is also allowed to follow the opening and closing movements of the door.

As is clear from the above, according to the invention, the wiring harness to be arranged between the door and the body of the vehicle is arranged not in the same position as the hinge point, but in the position more inward toward the passenger compartment. Accordingly, the wiring harness is required to have both an extendible/contractible function and a twisting function when the door is opened and closed. Since the guide member having both functions is provided and the wiring harness is mounted on this guide member, the wiring harness extends and contracts while twisting as the door is opened and closed, smoothly following the movement of the door.

Further, since the guide member is a narrow tube through which the wiring harness is only passed or a narrow plate which only holds the wiring harness, it can be accommodated in a small space between the door and the body and, accordingly, is not very much exposed to the passenger compartment. Thus, the guide member does not degrade the appearance. Furthermore, since the guide member is small and lightweight, the mounting of the guide member does not require an increased force to open and close the door, i.e. does not make the door heavier to open and close.

Further, since the wiring harness is arranged in a position more inward than the hinge point and the weatherstrip or sealing means, it is not necessary to provide a water preventing means for the wiring harness, obviating the need to use grommets or like conventional water preventing devices.

Furthermore, since the wiring harness is arranged at the side of the inner surface of the inner plate of the door panel, a conventionally required operation of arranging the wiring harness inside the door panel and withdrawing it through the through hole formed in the front end surface of the door panel can be eliminated. As a result, an operation of arranging the wiring harness into the door panel can be considerably made easier as compared with the prior art.

Preferably, the arcuate portion of the guide member constructs a part of a torsion coil spring, and a door fixing portion and a body fixing portion are provided at bent portions formed by bending the opposite ends of the arcuate portion. By shaping the arcuate portion similar to the spring, the guide member and the wiring harness can securely have both an extendible/contractible function and a twist take-up function.

Further, the arcuate portion of the guide member may be a S-shaped continuous arcuate portion, and a door fixing portion and a body fixing portion are provided at bent portions formed by bending the opposite ends of the arcuate portion. By configuring the arcuate portion into S-shape, similar to the previous embodiment, the arcuate portion can have both an extendible/contractible function and a twist take-up function, and the positions where the wiring harness is inserted into the door and the vehicle body can be displaced along the vertical direction.

Preferably, the guide member is in the form of a tube through which the wiring harness is passed. By making the guide member tubular and passing the wiring harness therethrough, the wiring harness can be protected and kept out of water.

Alternatively, the guide member may be in the form of a plate to which the wiring harness is fixed by taping. Any construction which allows the movement of the wiring harness to follow that of the guide member may be adopted.

Preferably, the restoring force of the guide member is set such that the guide member is restored to its original shape faster than the door is closed. By setting the restoring speed of the guide member and the wiring harness higher, the jamming of the guide member between the door and the vehicle body can securely be prevented.

The door fixing portion and the body fixing portion are preferably fixed to opposite end surfaces of the door and of the vehicle body, or to an end surface or a lower surface of an instrument panel of the vehicle body toward the door and a surface of the door toward the passenger compartment.

Specifically, the guide member may be provided between the vehicle body and a surface opposite thereto. In such a case, the length of the guide member can be shortened. Alternatively, the guide member may be provided between the end surface of the instrument panel toward the door and the inner surface of the door toward the passenger compartment.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Hereafter, embodiments of the invention are described in detail with reference to the accompanying drawings, wherein same or similar elements are denoted with same or similar reference signs.

Figure 1:
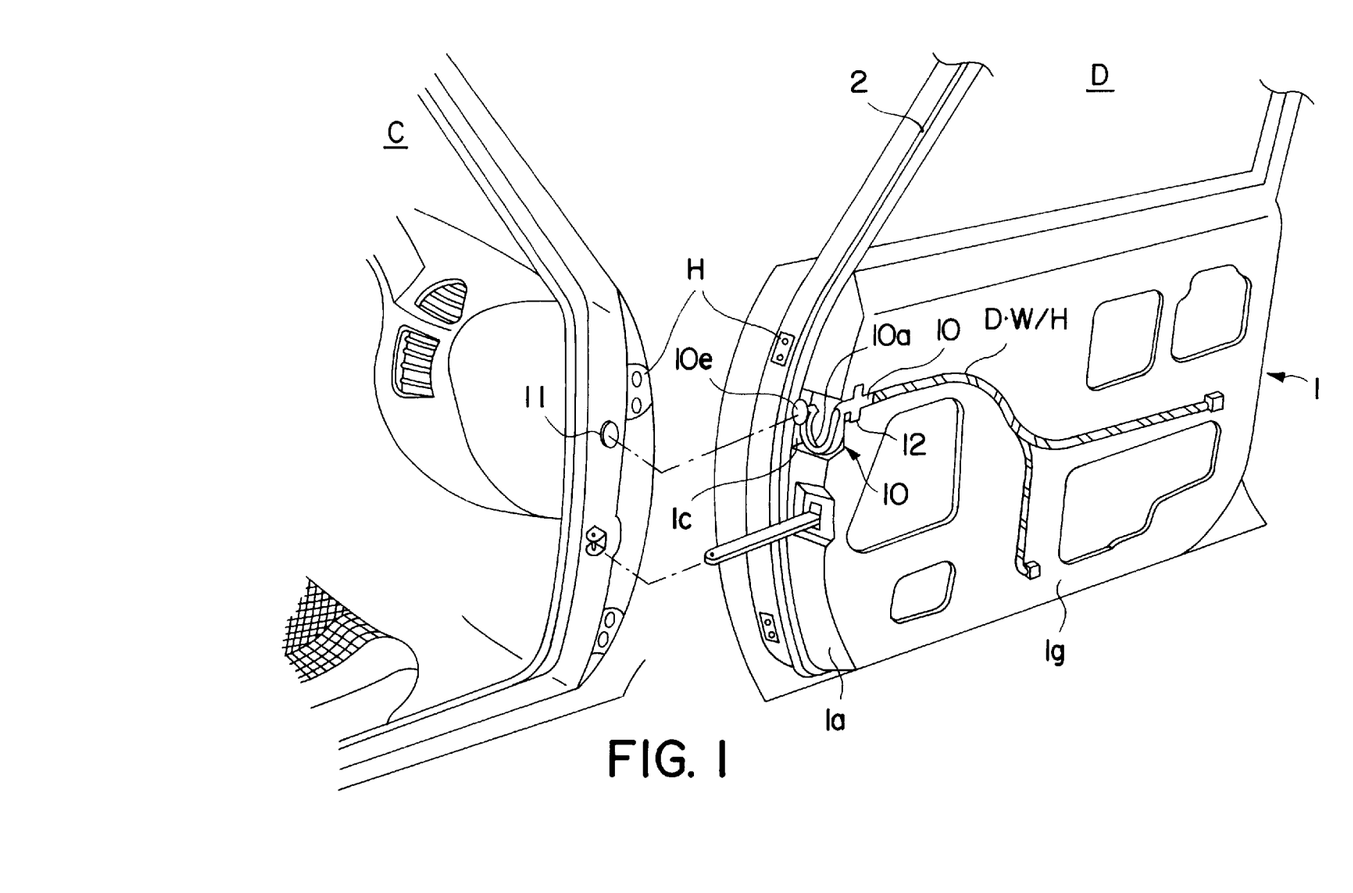
FIG. 1 is a perspective view of a first embodiment of the invention.
Figure 2:
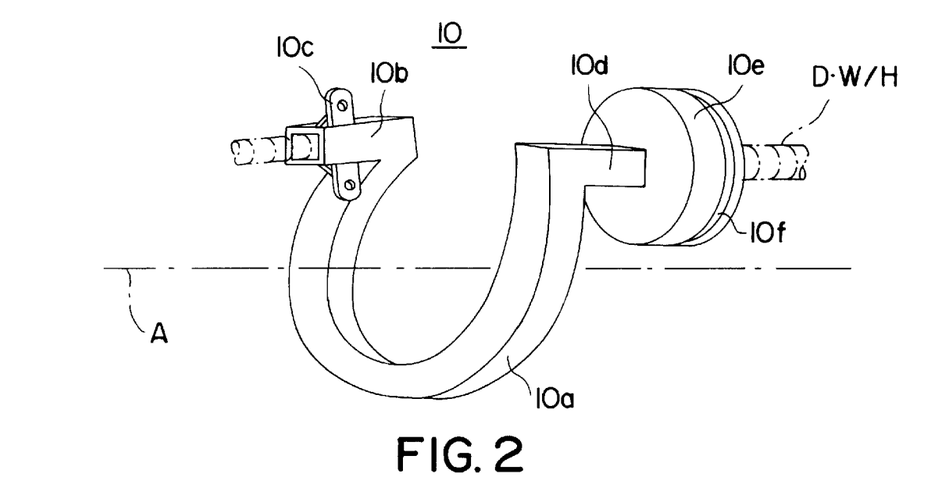
FIG. 2 is a perspective view of a guide tube used in the first embodiment.
Figure 3A:
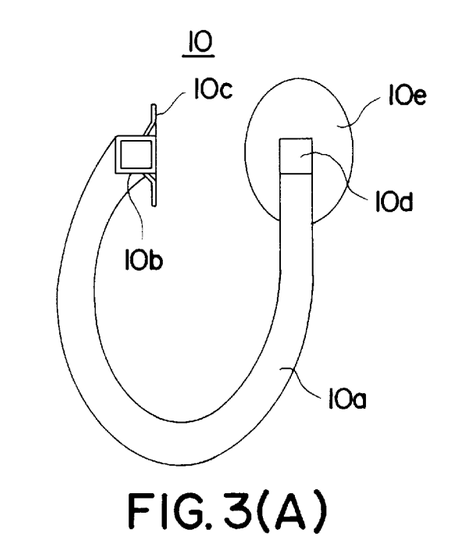
FIGS. 3(A) and 3(B) are a side view and a front view of the guide tube, respectively.
Figure 3B:
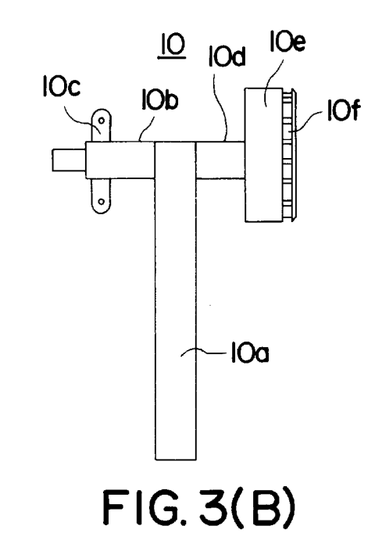

FIGS. 1 to 4 show a first embodiment in which a door harness DW/H is arranged in a door hinge portion between a door D and a body C of a vehicle while extending from a front end surface 1a of a door panel 1 to the body C. A front part of the door harness DW/H arranged in the door hinge portion is passed through a guide tube 10, which may be configured as shown in FIGS. 2, 3(A) and 3(B). The guide tube 10 is a narrow tube having a hollow portion through which the door harness DW/H can be passed. The guide tube 10 itself extends and contracts while twisting as the door D is opened and closed, so that the movement of the door harness DW/H therein can follow the opening/closing movement of the door D.

The guide tube 10 is made of an elastic material such as a hard rubber, an elastomer or an elastic resin (polycarbonate, etc.). The guide tube 10 has an outer shape similar to that of a part of a torsion coil spring. In the first embodiment, the opposite ends of an arcuate portion 10a are bent in a direction at an angle different from 0° or 180°, preferably substantially normal to a direction of winding of the bent or curved or arcuate portion 10a, e.g. the ends of the arcuate portion 10a wound in the vertical direction are bent in the horizontal direction. The arcuate portion 10a is bent or curved such that it is arranged in substantially each position at an angle different from 0° or 180° to an extension or longitudinal axis A thereof (FIG. 2). A door fixing portion 10c is so provided as to project from the leading end of one bent portion 10b, whereas a body fixing portion 10e having a large diameter and a large thickness to be sealably fitted into a through hole 11 of the body C is provided at the leading end of the other bent portion 10d. An engaging groove 10f is formed in the outer circumferential surface of the body fixing portion 10e. The through hole 11 formed in the body C is also located more toward the passenger compartment than a hinge H.

In the door panel 1 of the door D, a weatherstrip or sealing means 2 is mounted in a position which is more toward the passenger compartment than a part of the hinge H to be connected with its mating part of the body C. A recess 1f (FIG. 4) used to mount the guide tube 10 is formed in the end surface 1a of the door panel 1 more toward the passenger compartment than the mount position of the weatherstrip 2.

As shown in FIG. 1, the door harness DW/H having its front end portion passed through the guide tube 10 is arranged along an inner surface 1g of an inner plate of the door panel 1, and the arcuate portion 10a of the guide tube 10 is fitted or inserted in the recess 1f of the end surface 1a at the front end side of the door harness DW/H. In this state, the door fixing portion 10c is secured by screws 12 or the like fixing means, in particular from the inner surface 1g. The other bent portion 10d of the arcuate portion 10a is extended to the body C; the body fixing portion 10e is pressed into the through hole 11 and is secured to the body C by engaging the engaging groove 10f with the edge of the through hole 11.

As described above, the arcuate portion 10a of the guide tube 10 is accommodated in the recess 1f formed more toward the passenger compartment than the hinge point of the hinge H and the weatherstrip 2 (i.e. at a greater radial distance as measured from the pivoting axis); the door fixing portion 10c is secured to the inner surface 1g of the inner plate of the door panel 1; and the through hole 11 is formed in the body C in a position more toward the passenger compartment than the hinge H. Accordingly, the door harness DW/H arranged in the door hinge portion is located more toward the passenger compartment than the hinge H. Thus, the door harness DW/H needs to extend while twisting according to an opening angle of the door D when the door is opened. Similarly, when the door is closed, the door harness DW/H needs to contract while untwisting.

The guide tube 10 which contains a part of the door harness DW/H in the door hinge portion is made of an elastic material and has a configuration similar to that of a part of a torsion coil spring. Accordingly, when the opposite bent portions 10b, 10d are pulled in directions away from each other, the arcuate portion 10a extends. Upon releasing the pulling force, the arcuate portion 10a is restored to its original configuration shown in FIGS. 1 to 3. Taking advantage of this property of the guide tube 10, the door harness DW/H inside the guide tube 10 is caused to extend while twisting or being subject to torsion or deformation and to contract while untwisting or restore according to the extension and contraction of the arcuate portion 10a as the door D is opened and closed. The contracting speed of the door harness DW/H is set higher than the closing speed of the door D.

Figure 4:
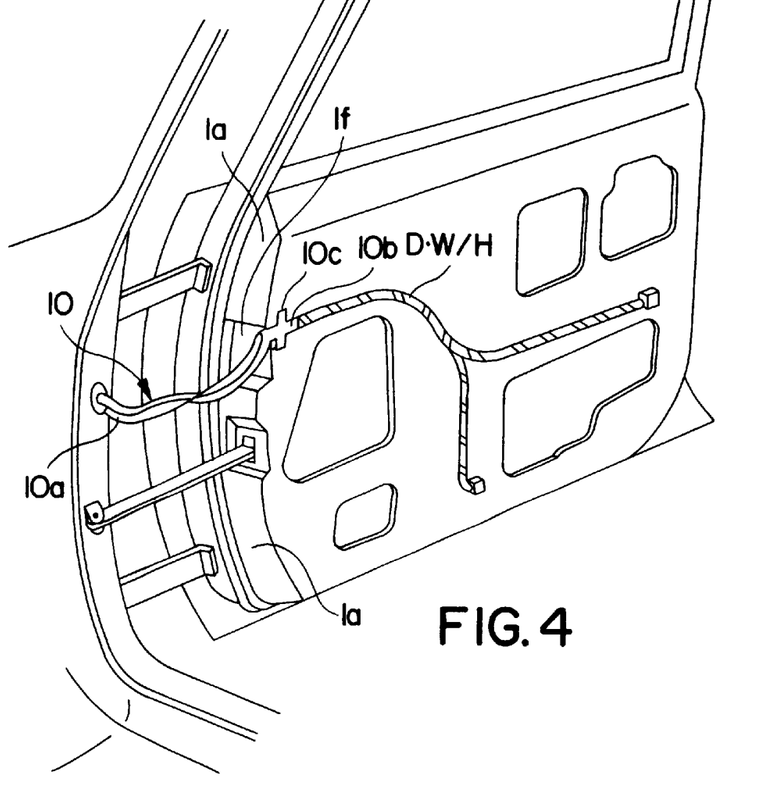
FIG. 4 is a perspective view showing the action of the first embodiment.

Specifically, while the door D is closed, the arcuate portion 10a of the guide tube 10 is accommodated in the recess 1f in the end surface 1a while being contracted as shown in FIG. 1. When, in this state, the door D is opened as shown in FIG. 4, the guide tube 10 and the door harness DW/H therein substantially linearly extend toward the body C, following the opening movement of the door D. In other words, the door harness DW/H hanging down in U-shape in the guide tube 10 extends in the horizontal direction, following the opening movement of the door D. When the opened door D is closed, the guide tube 10 having a restoring force is restored to its original configuration by being pressed by the door D, converting a horizontal extension into a U-shape hanging down. As a result, the guide tube 10 and the door harness DW/H are contracted.

As described above, the guide tube 10 has both a bent function and an extendible/contractible function, wherein the bent function and the extension/contraction function are combined in a twist/untwist function or twist take-up function of the guide tube 10. Accordingly, the door harness DW/H passed through the guide tube 10 extends while twisting and contracts while untwisting as the door is opened and closed. Thus there is provided a feeding function for feeding or providing wiring harness needed to compensate an extension due to the relative movement of the fixing positions of the wiring harness, when the door is opened. In other words there is a length providing function allowing for an extension of the wiring harness.

Instead of the guide tube 10, a narrow guide plate having the same or similar configuration may be provided and the wiring harness may be secured to this guide plate by taping or the like. It should be appreciated that fixing portions with the door and the body are also provided at the opposite ends of the guide plate.

Figure 5:
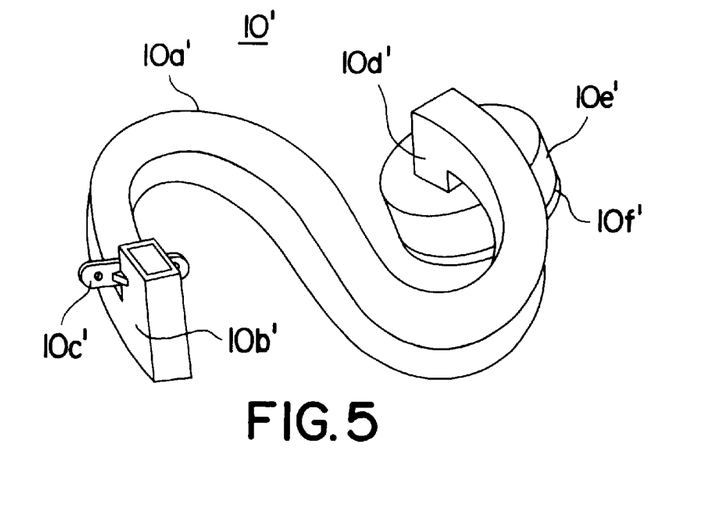
FIG. 5 is a perspective view of a guide tube according to a second embodiment.

FIG. 5 shows a second embodiment in which, instead of the arcuate portion 10a which extends and contracts while twisting, a guide tube 10' has a substantially S-shaped portion 10a'.

Similar to the first embodiment, horizontally bent portions 10b' and 10d' are provided at the opposite ends of the S-shaped portion 10a'. A door fixing portion 10c, and a body fixing portion 10e' having a large diameter and a large thickness are provided at the leading ends of the bent portions 10b' and 10d', respectively.

Similar to the guide tube 10 of the first embodiment, the guide tube 10' extends while twisting. Specifically, the S-shaped portion 10a' extends in the horizontal direction by being pulled and contracts by being restored to its original configuration. Accordingly, the wiring harness passed through the guide tube 10' is also allowed to extend and contact as the door is opened and closed. Further, since the portion 10a' has a S-shape bent in a direction at an angle different from 0° or 180°, preferably substantially normal to the direction of extension, the guide tube 10' can be used even if the insertion positions of the wiring harness into the door D and the body C open in substantially opposite directions.

Figure 6:
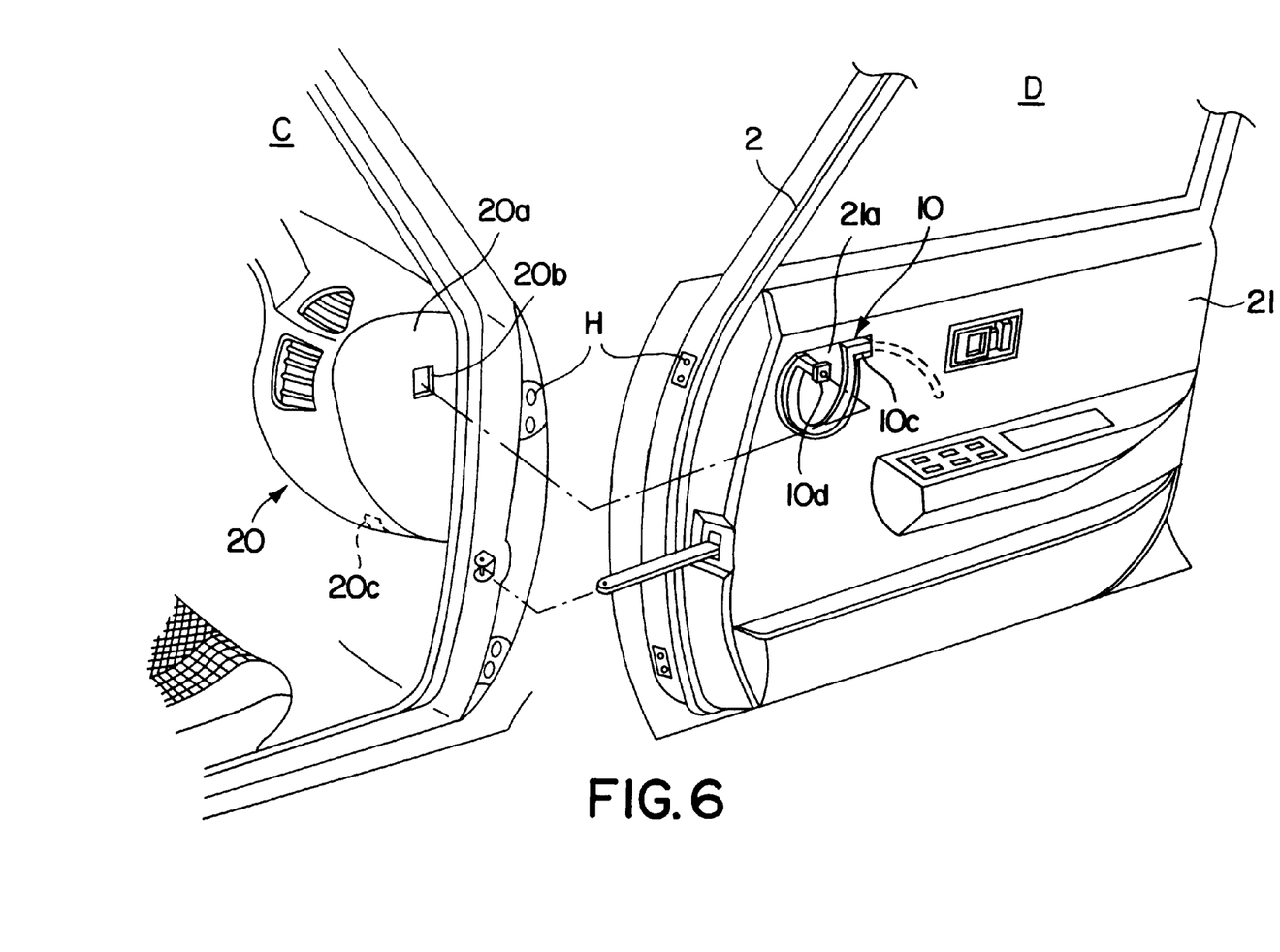
FIG. 6 is a perspective view of a third embodiment.
Figure 7A:
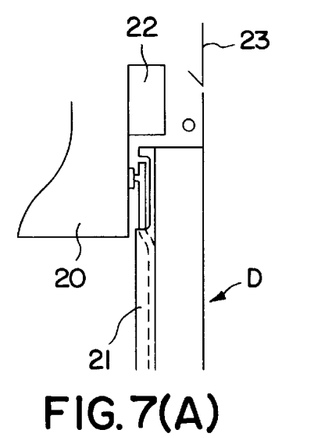
FIGS. 7(A) and 7(B) are schematic plan views of the guide tube according to the third embodiment when the door is closed and opened, respectively.
Figure 7B:
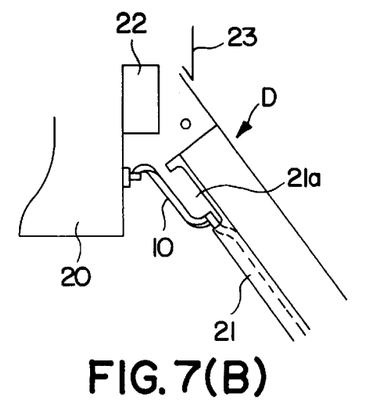

FIGS. 6, 7(A) and 7(B) show a third embodiment in which a guide tube 10 similar to that of the first embodiment is provided between an end surface 20a of an instrument panel 20 of a body C and a trim panel 21 as an inner surface of a door D toward the passenger compartment. Specifically, a recess 21a for accommodating the guide tube 10 is formed in the trim panel 21. The guide tube 10 is accommodated in the recess 21a to fix a door fixing portion 10c thereof, and a body fixing portion 10e at the other end of the guide tube 10 is locked in an opening 20b formed in an end surface 20a of the instrument panel 20 toward the door D. In FIGS. 7(A) and 7(B), identified by 22, 23 are a pillar and a fender, respectively.

In the case that the guide tube 10 is arranged between the instrument panel 20 and the trim panel 21, the end surface 20a of the instrument panel 20 and a front part of the trim panel 21 of the door D are substantially opposite to each other as shown in FIG. 7(A) when the door is closed, and the guide tube 10 is located in a space defined between the end surface 20a and the trim panel 21 and accordingly cannot be seen from the passenger compartment. On the other hand, when the door D is opened, the guide tube 10 extends while twisting or having a torsion as shown in FIG. 7(B), with the result that the wiring harness extends according to the opening movement of the door D.

In the case that the guide tube 10 is mounted between the instrument panel 20 and the inner surface of the door toward the passenger compartment as described above, the extended length thereof is or may be as long as 200 to 300 mm. In view of this, the arcuate portion 10a may be formed to have a large diameter or may be wound one full time, twice, three or more times to be substantially spiral as in a coil spring.

Further, as shown by phantom line in FIG. 6, the door harness may be arranged along the lower surface of the instrument panel 20 near the door D and the guide tube 10 mounted on the door harness may be fixed to the pillar by a clip or the like.

What is claimed is:

1. A wiring harness arranging device for arranging a wiring harness between a first element and a second element that are movable with respect to each other, comprising:

an elongate guide member made of an elastic material and being configured to have the wiring harness mounted thereto, the guide member having opposite first and second ends, an arcuate portion being formed between the first and second ends and defining a section of a coil generated about an axis, the arcuate portion having first and second coil end portions, a first bent portion extending from the first coil end portion to the first end of the elongate guide member and being aligned at an angle to the first coil end portion, the first bent portion having means for fixed connection to the first element, a second bent portion extending from the second coil end portion to the second end of the guide member, the second bent portion being aligned at an angle to the second coil end portion and having means for fixed connection to the second element such that relative movements of the first and second elements generate expansion, contraction and twisting of the arcuate portion of the guide member.

2. A wiring harness arranging device according to claim 1, wherein the guide member is in the form of a tube through which the wiring harness is passed.

3. A wiring harness arranging device according to claim 1, wherein the guide member has a restoring force set such that the guide member is restored to its original shape faster than the first and second elements are moved toward each other.

4. The wiring harness arranging device according to claim 1, wherein the first and second bent portions are substantially parallel to one another.

5. A wiring harness arranging device according to claim 1, wherein the first and second bent portions are substantially parallel to the axis about which the arcuate portion is generated.

6. A wiring harness arranging device according to claim 1, wherein the first and second bent portions are aligned at angles of substantially 90° to the first and second coil end portions respectively.

7. A wiring harness arranging device according to claim 1, wherein the guide member is substantially free of corrugations.

8. A wiring harness arranging device for arranging a wiring harness between a vehicle body and a door, the vehicle body and the door being hingedly connected to one another by a hinge for movement between an open and a closed condition of the door, the door being provided with a weatherstrip for sealingly engaging the vehicle body, the wiring harness arranging device being connectable to locations on the vehicle body and the door inwardly from the hinge and the weatherstrip, the wiring harness arranging device comprising:

an elongate guide member made of an elastic material and having means for securely receiving the wiring harness, the guide member having opposite first and second ends, an arcuate portion substantially defining a section of a coil generated about an axis, the arcuate portion having opposite first and second coil end portions, a first bent portion extending from the first coil end portion to the first end of the guide member, the first bent portion being aligned at an angle to the first coil end portion and having means for fixed connection to the door, a second bent portion extending from the second coil end portion to the second end of the guide member, the second bent portion being aligned at an angle to the second coil end portion and having means for fixed connection to the vehicle body so that movement of the guide member and the wiring harness follows relative movements generated during opening and closing of the door relative to the vehicle body and so that the arcuate portion extends and contracts while twisting during the opening and closing of the door.

9. A wiring harness arranging device according to claim 8, wherein the guide member is in the form of a tube through which the wiring harness is passed.

10. The wiring harness arranging device according to claim 8, wherein the guide member has a restoring force set such that the guide member is restored to its original shape faster than the first and second elements are moved toward each other.

11. The wiring harness arranging device according to claim 8, wherein the first and second bent portions are substantially parallel to one another.

12. A wiring harness arranging device according to claim 8, wherein the first and second bent portions are substantially parallel to the axis about which the arcuate portion is generated.

13. A wiring harness arranging device according to claim 8, wherein the first and second bent portions are aligned at angles of substantially 90° to the first and second coil end portions respectively.

14. A wiring harness arranging device according to claim 8, wherein the guide member is substantially free of corrugations.

* * * * *